United States Patent [19]

Asanagi

[11] 4,203,954

[45] May 20, 1980

[54] PROCESS FOR DESULFURIZATION OF EXHAUST GASES RECOVERING GYPSUM AS BY-PRODUCT

[75] Inventor: Etsuo Asanagi, Kashiwa, Japan

[73] Assignee: Chiyoda Chemical Engineering & Construction Co., Ltd., Kanagawa, Japan

[21] Appl. No.: 893,446

[22] Filed: Apr. 4, 1978

[30] Foreign Application Priority Data

Apr. 5, 1977 [JP] Japan ................................. 52-38106

[51] Int. Cl.$^2$ ............................................. C01B 17/00
[52] U.S. Cl. ....................................... 423/243; 423/166
[58] Field of Search ........................... 423/242, 243, 166

[56] References Cited

U.S. PATENT DOCUMENTS

| | | | |
|---|---|---|---|
| 3,757,488 | 9/1973 | Austin et al. | 423/243 X |
| 3,798,309 | 3/1974 | Knowles et al. | 423/243 |
| 3,928,537 | 12/1975 | Saitoh et al. | 423/243 |
| 3,972,980 | 8/1976 | Lowell | 423/166 |
| 3,983,217 | 9/1976 | Muraki et al. | 423/242 |
| 3,987,149 | 10/1976 | Saitoh et al. | 423/243 |

FOREIGN PATENT DOCUMENTS

| | | | |
|---|---|---|---|
| 2548346 | 5/1976 | Fed. Rep. of Germany | 423/242 |
| 50-38681 | 4/1975 | Japan . | |
| 50-130697 | 10/1975 | Japan . | |
| 51-18269 | 2/1976 | Japan . | |
| 52-19175 | 2/1977 | Japan . | |
| 52-30294 | 3/1977 | Japan . | |
| 52-92899 | 8/1977 | Japan . | |

Primary Examiner—O. R. Vertiz
Assistant Examiner—Gregory A. Heller
Attorney, Agent, or Firm—Armstrong, Nikaido, Marmelstein & Kubovcik

[57] ABSTRACT

This invention relates to a process for desulfurization of exhaust gases wherein the sulfur oxides are efficiently removed in the stabilized form from exhaust gases containing said sulfur oxides and at the same time gypsum of good quality is recovered. More particularly, this invention relates to a process wherein exhaust gases are treated with a slurried solution of gypsum containing a specified organic acid component, sulfuric acid component, and an alkali component at a pH value of 5-3 so that the sulfur oxides in said exhaust gases are absorbed and oxidized to form gypsum which is recovered as a by-product of good quality containing no unreacted lime.

7 Claims, 3 Drawing Figures

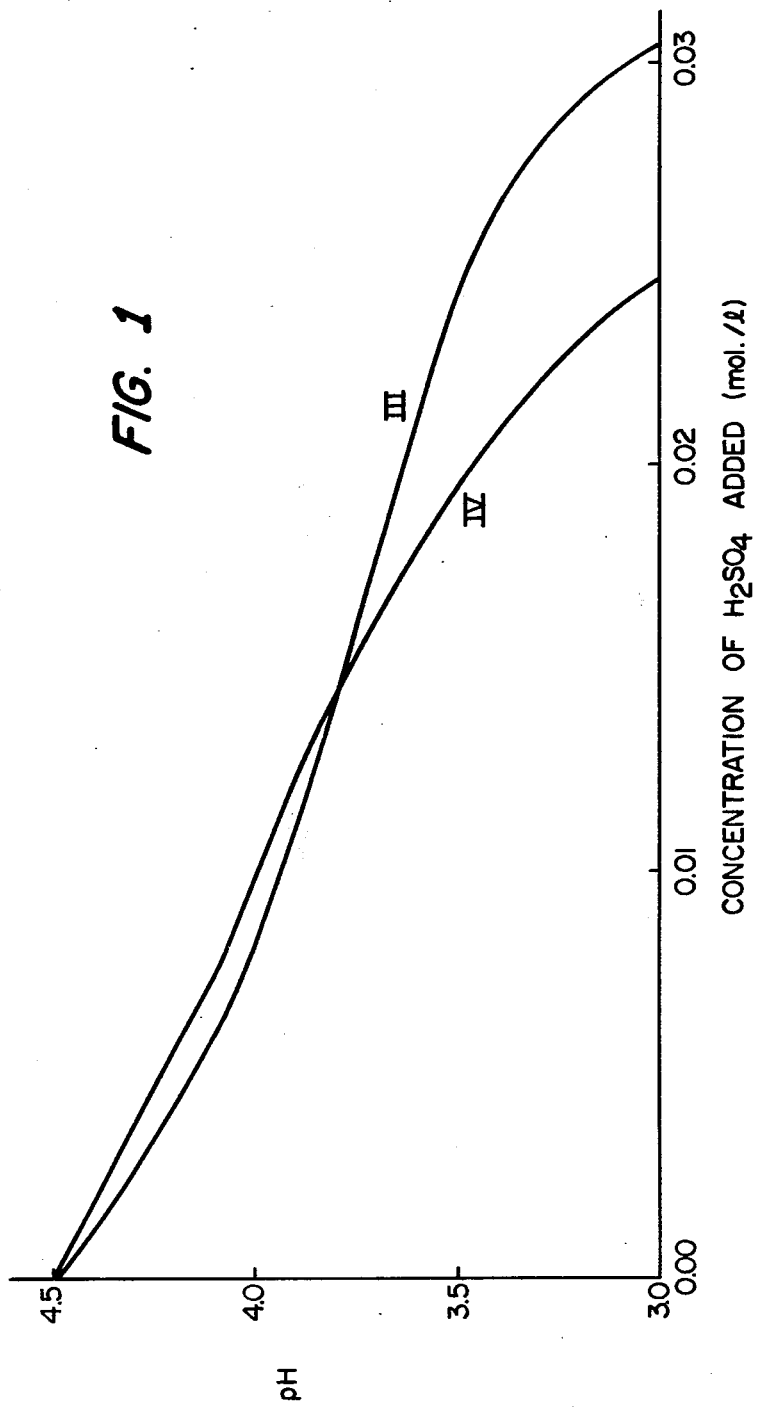

PROCESS FOR DESULFURIZATION OF EXHAUST GASES RECOVERING GYPSUM AS BY-PRODUCT

BACKGROUND OF THE INVENTION

Field of the Invention

As processes for removing the sulfur oxides in exhaust gases for the purpose of preventing public nuisance there have been proposed various processes. Since the sulfur oxides are acids in nature, in order to make them harmless, after all it is necessary to neutralize them. Accordingly, most of the processes for desulfurization of exhaust gases now in operation in our country are adopting those which utilize as the neutralizing agent lime which is readily available at the lowest and most stable cost, providing gypsum as by-product. Gypsum is a harmless, incombustible, and chemically stable material, which can find many effective uses and also can be disposed of without causing any secondary public nuisance by appropriating it to land reclamation. These processes for desulfurization wherein the lime used as the neutralizing agent is recovered as gypsum, however, depend on how efficiently and steadily the sulfur oxides can be removed and how far the lime can be utilized, and therefore, how to make the process for desulfurization more feasible and economical in operation even by simplifying the steps is becoming one of the important subjects.

In the lime gypsum process, in which a slurry of calcium hydroxide, calcium oxide, or lime stone (Calcium carbonate) is used as an absorbent, the absorption reaction of the sulfur oxides is controlled by the rate of dissolution of the lime in the form of a slurry. Since in the acidic region where the solubility of lime is high the absorption efficiency of sulfur oxides is poor, and moreover, the buffer action for pH of said slurried solution is scanty, the absorption of the sulfur oxides causes a marked decrease in the pH value, adversely affecting the absorption. Thus, in order to increase the rate of absorption of sulfur oxides it is necessary either to add the lime in an amount in excess of the chemical equivalent to the sulfur oxides being absorbed so that the absorption tower can be operated in the more basic region or to resort to a multi-stage process for scrubbing. However, in the basic region scaling is liable to occur intensely in the absorption tower, etc., and also, when the pH value of the slurried solution is larger than 5, the solubility of calcium sulfite decreases forming a precipitate, so that the oxidation reaction of the calcium sulfite proceeds as a heterogeneous reaction. As a result it is necessary either to use a specially designed apparatus for oxidation or to carry out the oxidation at a pH value of the slurried solution below 4.5 after the unreacted lime in the slurry has been treated with sulfuric acid. That is to say, in the lime gypsum process the condition favorite to the absorption capacity of the sulfur oxides acts quite antagonistically to the condition required for the prevention of scaling as well as for the accelerated oxidation of the calcium sulfite. On the other hand, based on the hitherto known fact that the rate of oxidation reaction of calcium sulfite is largely affected by the pH value of the slurry, there has been proposed a lime gypsum process in which the steps have been simplified. This is a process for desulfurization in which the absorption and oxidation of the sulfur dioxide and the byproduction of gypsum are performed in a single step while contacting the slurried solution absorbent whose pH value has been made less than 5 with exhaust gases in the presence of oxygen gas. Even in such a process for desulfurization, however, the absorption capacity of sulfur dioxide is so scanty that it is applicable only to the treatment of exhaust gases whose sulfur dioxide content is as low as about 500 ppm, and moreover, on account of the poor buffer action for pH of the slurried solution it is very hard to operate the process in a steady state.

SUMMARY OF THE INVENTION

The present inventors, as a result of an elaborate investigation on these subject matters, have finally succeeded in the establishment of an economical process for desulfurization of exhaust gases, wherein gypsum of good quality can be efficiently recovered in a stable operation, which process comprises contacting a slurried solution of gypsum which contains a specified organic acid component, sulfuric acid component, and an alkali component at a pH value of 5–3 as an absorbent solution with exhaust gases containing sulfur oxides in the coexistence of oxygen while adding lime to said slurried solution of gypsum so that the absorption and oxidation of said sulfur oxide and the formation of gypsum can be performed independently and simultaneously in a single apparatus.

The process of this invention is a reasonable process for desulfurization of exhaust gases in which the action as a reaction medium of the specified organic acid component, the buffer action for pH of the same, all the characteristics including the solubility, etc. of lime, calcium sulfite, and gypsum, and the pH value conditions of the slurried solution of gypsum have been utilized in an ingenious manner. Namely, this invention is a process for desulfurization of exhaust gases recovering gypsum as by-product, which process comprises (A) a step for cleaning exhaust gases which involves carrying out the contact reaction which comprises contacting a slurried solution of gypsum containing 0.05–1.5 moles/l of gypsum along with 0.001 mole/l or more of an organic acid component represented by the general formula: HOOCRCOOH (wherein R represents ethylene group, hydroxyethylene group, dihydroxyethylene group, or vinylene group), 0.001 mole/l or more of sulfuric acid component, and an alkali component at a pH value of 5–3 with exhaust gases in the presence of oxygen-containing gas and the absorption and oxidation of the sulfur compounds as well as the formation reaction of gypsum, that are caused by the addition of lime, simultaneously in a single apparatus and (B) a step of separating gypsum for recovery in which portion of said slurried solution of gypsum is withdrawn to separate the gypsum for recovery and the mother liquor is recycled to the above described step (A).

The characteristic features of this invention are found in that the steps of the process for desulfurization of exhaust gases are simplified and the absorption and oxidation of the sulfur oxides in the exhaust gases as well as the formation of gypsum can be readily achieved in a stable operation within a single apparatus, and moreover, inexpensive lime stone is available as the lime to be added. In addition to this, the salts of the specified organic acid component can exhibit a distinguished habit modifying action against hemihydrate of alpha-type, so that the gypsum recovered by the direct withdrawal from the process for desulfurization of this invention can be converted to hemihydrate of alpha-type by subjecting to hydrothermal treatment at 95-150° C. without particular addition to any habit modifier. The hemihydrate of alpha-type gives by the ordinary hydraulic setting set plaster which has a strength about 10 times as high as that from the hemihydrate of beta-type. Therefore, the gypsum recovered in this invention can be readily utilized as the hemihydrate of alpha-type for industrial purposes in mould material rather than as the conventional cement or building materials.

DESCRIPTION OF PREFERRED EMBODIMENT

Figure 3:
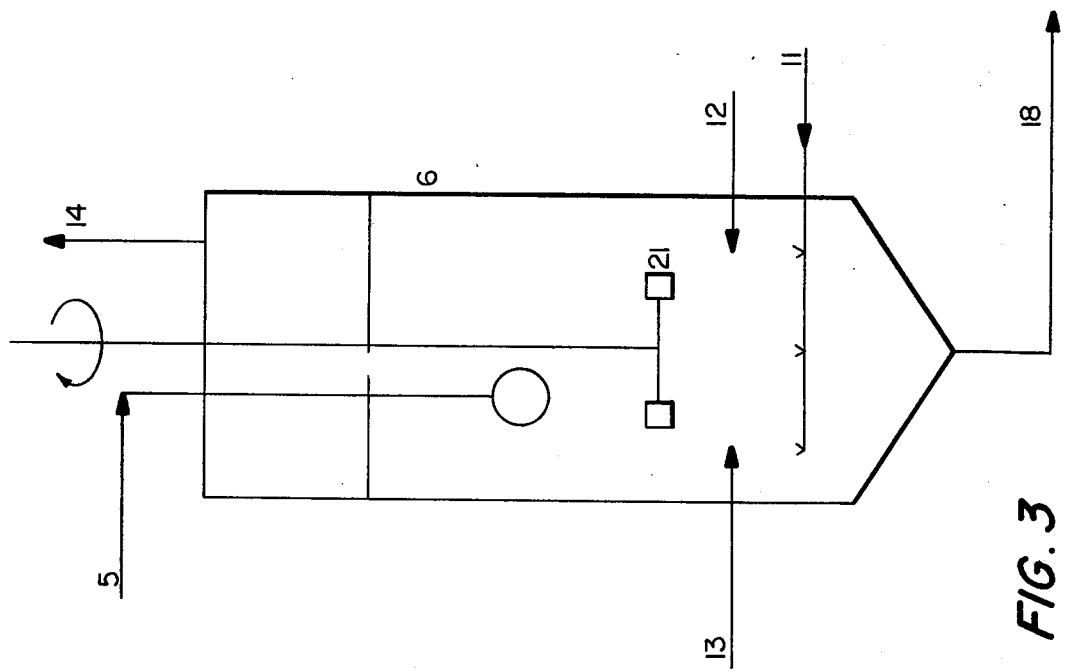

The specified organic acid component contained in the slurried solution of this invention includes succinic acid, malic acid, tartaric acid, maleic acid, fumaric acid, etc. that are represented by the general formula: HOOCRCOOH (wherein R represents ethylene group, hydroxyethylene group, dihydroxyethylene group, or vinylene group), and they are readily available at all times as dibasic acids having low vapor pressures. These acid components may be used alone or in combination. These specified organic acid components are adjusted so as to give a predetermined component concentration using the free acids and alkali salts. As the alkali component in this invention Li, K, Na, Rb, Cs, $NH_3$ and Mg are used alone or in combination. From the aspect of industrial practive Na, $NH_3$, K, and Mg are preferably used alone or in combination. The alkali component is added as the salt of the specified organic acid, carbonate, sulfate, hydroxide, or oxide. Also, since several ppm—several tens ppm of metal ions such as $Co^{2+}$, $Ni^{2+}$, $Fe^{2+}$, $Mn^{2+}$, $Cu^{2+}$, etc. have catalytic action on the oxidation of sulfur dioxide their coexistence is desirable. The concentration of the specified organic acid component may vary depending on the particular kind of the organic acid used, but usually it should be more than 0.001 mole per liter within the range in which the specified organic component does not yet deposit under the operating conditions. Under the condition that the concentration of the specified organic acid component is less than 0.001 mole per liter, the concentration serving as the reaction medium is insufficient so undesirably that its working effect and the buffer action for pH of the slurried solution of gypsum become poor. When the effect as the reaction medium and the buffer action for pH of the slurried solution of gypsum become poor, there is formed as precipitate of calcium sulfite whose smooth oxidation is thereby hindered, and also, the adjustment of the pH value of the slurried solution of gypsum, which is carried out for the purpose of prevention of the scaling, becomes so complicated, that incidental facilities are newly required for instrumentation, etc. as well as labor and time are more required for operation and maintenance. The optimum concentration of the specified organic acid component used varies depending on the kind and concentration of the alkali component, the concentration of the sulfuric acid component, the pH value of the slurried solution of gypsum, the operating temperature, etc., but in general it is preferably 0.01-0.3 mole per liter. Also, the concentration of the alkali component is governed by the kind and concentration of the specified organic acid component, the concentration of the sulfuric acid component, and the pH value of the slurried solution of gypsum being treated. Although the slurried solution of gypsum contains the sulfuric acid component, by the term "sulfuric acid component" as used in this invention is meant the sulfuric acid component which is in the dissolved state, so that the sulfuric acid component which is dispersed without dissolving in the slurried solution of gypsum is not contained therein. The optimum concentration of the sulfuric acid component varies depending on the kind and concentration of the specified organic acid component, the pH value of the slurried solution of gypsum, the concentration of the alkali component, and the operating conditions, but in general it is used in an almost equimolar concentration to the specified organic acid component. In order to neutralize the sulfuric acid component which is formed by the absorption and oxidation in the slurried solution of gypsum, of the sulfur oxides contained in exhaust gases so that said sulfuric component is converted to gypsum, a chemical equivalent of lime is added in the step for cleaning exhaust gases. But, by virtue of the effective action of the sulfuric acid component which has beforehand been allowed to be present in the slurried solution of gypsum, the reaction can proceed very smoothly even without relying on the sulfuric acid component formed by the absorption and oxidation of the sulfur oxides in the exhaust gases. That is to say, even when the concentration of the specified organic acid component is high, portion of it prevents the calcium salt from precipitating, and also, the lime added reacts with the sulfuric acid component which has beforehand been added to form gypsum, but the aiding action of the free carboxylic acid in the organic acid component, so that the pH value of the slurried solution of gypsum can be smoothly adjusted rendering possible the stable operation of the process for desulfurization of exhaust gases. The concentration of the gypsum which is dispersed as an insoluble in the slurried solution of gypsum is 0.05-1.5 moles per liter (1-20% by weight). When the concentration of gypsum dispersed in the slurried solution is below 0.05 mole per liter, the liquid volume of the slurried solution of gypsum sent to the step of separation of gypsum becomes so large that a large load is necessitated requiring an enlargment of the separator. On the other hand, when the concentration of gypsum in the slurried solution is above 1.5 moles, the apparent viscosity becomes so high that the gas-liquid contact, dispersion, diffisuion, etc. are adversely affected, and therefore, it is necessary to maintain the concentration of gypsum dispersed without dissolving at 0.05-1.5 moles per liter. In the process for desulfurization of this invention the operation is carried out by adjusting the pH value of the slurried solution of gypsum within the range of 5-3, but the pH value varies being governed by the concentrations of the specified organic acid component, which exhibits different characteristics depending on the particular kind thereof, the sulfuric acid component, and the alkali component dissolved in the slurried solution of gypsum and the balance in their composition ratios. The reason why the pH value of the slurried solution of gypsum is taken to be 5-3 is that when the pH value of the solution is above 5, there is formed a precipitate of calcium sulfite whose smooth oxidation is thereby hindered, whereas in order to perform the neutralization and absorption of the sulfur dioxide gas in an efficient and satisfactory manner and also in order to oxidize the absorbed sulfur dioxide gas into sulfuric acid component in an advantageous way the pH value of the slurried solution of gypsum should be above 3. When the pH value of the slurried solution of gypsum is below 3, a large quantity of catalyst is required for the efficient and complete oxidation of the sulfur dioxide absorbed. Between the vapor pressure of sulfur dioxide in the absorption equilibrium and the concentration of the sulfur dioxide dissolved in the undissociated state in the solution there holds Henry's law, and the concentration of the sulfur dioxide dissolved in the undissociated state is largely governed by the pH value of the solution and the concentration of the total sulfurous acid component in the solution. Almost all of the sulfur dioxide gas which has dissolved from exhaust gases in the slurried solution of gypsum is present in the form of $HSO_3^-$ under the condition of the pH value being 5–3 that is dealt with in this invention, while small portion of it is present in the form of either $SO_3^{2-}$ or undissociated sulfur dioxide gas. The relationships between the concentration of the total sulfurous acid component $C_{SO_2}$ (mole/1) and the degree of undissociation of the sulfur dioxide gas in the slurried solution of gypsum $\rho$ and the vapor pressure of the sulfur dioxide gas in equilibrium $P_{SO_2}$ (atm) are given by the following equations (1) and (2).

$$\rho = \frac{[H^+]^2}{[H^+]^2 + [H^+]K_1 + K_1 \cdot K_2} \quad (1)$$

$$P_{SO_2} = H \cdot C_{SO_2} \cdot \rho \quad (2)$$

[$H^+$]: Concentration of hydrogen ion (mole/1)
$K_1$: Apparent first dissociation constant of $SO_2$
$K_2$: Apparent second dissociation constant of $SO_2$
H: Henry's law constant (atm/mole)

Under the operating conditions of this invention at 55° C. the observed values of the apparent first and second dissociation constants and the Henry's law constant are roughly $2.5 \times 10^{-2}$, $6.3 \times 10^{-7}$, and 2.05 (atm/mole), respectively. From these dissociation constants it results that the effect of the pH value of the slurried solution of gypsum on the vapor pressure of the sulfur dioxide gas in absorption equilibrium markedly appears at a pH value above 2.5. In the case where the concentration of the total sulfurous acid component is constant, as the pH value increases by one, the vapor pressure of sulfur dioxide in equilibrium $P_{SO_2}$ falls one place in the figure. The chief factors having effects on the oxidation reaction of the sulfur dioxide absorbed are the gas-liquid contact area, the partial pressure of oxygen, the temperature, the pH value, the concentration of the total sulfurous acid component, and the kind and concentration of catalyst. As the catalyst use is made of $CO^{2+}$, $Ni^{2+}$, $Fe^{2+}$, $Mn^{2+}$, $Cu^{2+}$, etc. The amount of the catalyst used varies depending on the kind of the catalyst and the pH value, but it is preferably in the range of several ppm–several tens ppm under the operating conditions of this invention.

Also, the addition of a surface active agent to the slurried solution of gypsum in this invention causes a slight decrease in the surface tension of said solution, which results not only in that the absorption and oxidation of the sulfur oxides can be improved owing to the decreased liquid resistance at the time of absorption of the sulfur oxide gases, oxygen, etc. as well as the more finely divided gas bubbles during the passage of said solution through the bubble tower but also in that the growth of the gypsum into coarse large crystals is considerably promoted. As the surface active agent usable there may be mentioned anionic surface active agents which have sulfone group or sulfuric ester group as hydrophilic group and alkyl group, alkylphenol group, alkylnaphthalene group, or olefine group as liophilic group; non-ionic surface active agents which have ethylene glycol group as hydrophilic group and alkyl group or alkylphenol group as liophilic group; ampholytic surface active agents of Betaine type, etc. and these may be used in combination. The preferable surface active agents are anionic type, illustrative of which are alkylsulfonic acids or salts thereof, sulfuric esters of higher alcohols, alkylbenzenesulfonic acids or salts thereof, alkylnaphthalenesulfonates, alpha-olefinesulfonates, polyoxyethylenealkyl ethers, lauric acid diethanolamide, polyoxyethylenealkylphenol ethers, alkylbetaine, etc. The amount of the surface active agent used varies depending on the king thereof and the operating conditions, so that it cannot be defined sweepingly, but usually it is in the range of 1–50 ppm on the basis of the slurried solution of gypsum. When the surface active agent is added in an amount in excess of 50 ppm it may happen that too much foaming makes bubbles gush out from the apparatus along with gases.

In accordance with the step for cleaning exhaust gases in this invention, when the exhaust gases containing sulfur oxides are contacted with the slurried solution of gypsum of this invention, the sulfur dioxide is completely absorbed by the reactions represented by equations (3) and (4), and then oxidized by oxygen to form sulfuric acid component according to equations (5) and (6).

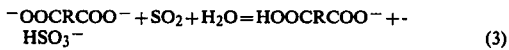

$$^-OOCRCOO^- + SO_2 + H_2O = HOOCRCOO^- + HSO_3^- \quad (3)$$

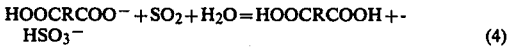

$$HOOCRCOO^- + SO_2 + H_2O = HOOCRCOOH + HSO_3^- \quad (4)$$

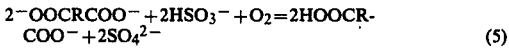

$$2\,^-OOCRCOO^- + 2HSO_3^- + O_2 = 2HOOCRCOO^- + 2SO_4^{2-} \quad (5)$$

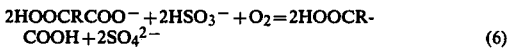

$$2HOOCRCOO^- + 2HSO_3^- + O_2 = 2HOOCRCOOH + 2SO_4^{2-} \quad (6)$$

The main reaction in the absorption reactions varies depending on the pH value of the slurried solution of gypsum and the kind of the organic acid contained therein. Also, the $SO_3$ contained in combustion gases is usually 3–4% on the basis of sulfur dioxide, and it is completely absorbed by the reactions represented by equations (7) and (8) to form sulfuric acid component.

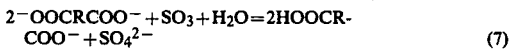

$$2\,^-OOCRCOO^- + SO_3 + H_2O = 2HOOCRCOO^- + SO_4^{2-} \quad (7)$$

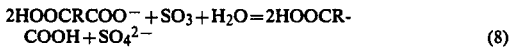

$$2HOOCRCOO^- + SO_3 + H_2O = 2HOOCRCOOH + SO_4^{2-} \quad (8)$$

On the other hand, the specified organic acid component in the slurried solution of gypsum acts as an reaction medium as shown by the reaction formulas of equations (3) to (8) inclusive, thereby the free carboxylic acid component and sulfuric acid component being increased, so that the pH value of the slurried solution of gypsum lowers along with the absorption capacity for sulfur oxides. Thereupon, a predetermined amount of lime is added so as to reactivate the slurried solution of gypsum whereby the lime is reacted with the sulfuric acid component and the free carboxylic acid to form gypsum and at the same time to restore the free carboxylic acid to the state of carboxylate ion. Needless to say, the amount of the lime added should be chemically equivalent to the sulfur oxides in the exhaust gases. The lime added can be smoothly reacted with the sulfuric acid component which has beforehand been added to the slurried solution of gypsum as above described even without relying on the formation of sulfuric acid component by the absorption and oxidation of the sulfur oxides in exhaust gases. Thus, the recovery of gypsum can be achieved without the necessity of any treatment step by which the gypsum slurry sent from the cleaning step of exhaust gases to the separating step of gypsum is freed from unreacted lime or other impurities. As the lime to be added use can be made of lime stone (calcium carbonate), quick lime, slaked lime or the mixtures thereof, but from the aspects of economy and operation the use of lime stone is most advantageous. When lime stone is used as lime, reactions of equations (9) and (10) take place, while when slaked lime is used reactions of the equations (11) and (12) take place.

$$2HOOCRCOOH + SO_4^{2-} + CaCO_3 = 2HOOCRCOO^- + CaSO_4\downarrow + CO_2\uparrow + H_2O \quad (9)$$

$$2HOOCRCOO^- + SO_4^{2-} + CaCO_3 = 2\,{}^-OOCRCOO^- + CaSO_4\downarrow + CO_2\uparrow + H_2O \quad (10)$$

$$2HOOCRCOOH + SO_4^{2-} + Ca(OH)_2 = 2HOOCRCOO^- + CaSO_4\downarrow + 2H_2O \quad (11)$$

$$2HOOCRCOO^- + SO_4^{2-} + Ca(OH)_2 = 2\,{}^-OOCRCOO^- + CaSO_4\downarrow + 2H_2O \quad (12)$$

Since the specified organic acid component added to the slurried solution of gypsum in this invention is an acid which is weaker than sulfuric acid and the acid resulting from the first dissociation of sulfurous acid but stronger than carbonic acid, it effectively acts as a reaction medium for the absorption of sulfur oxides and their conversion to gypsum, and moreover, it smoothly promotes the reaction. Further, the sulfuric acid component which has beforehand been added to the slurried solution of gypsum allows the lime continuously added in a predetermined amount to enter into reaction smoothly and prevents the byproduct gypsum from being contaminated with unreacted lime. In other words, in this invention, by adjusting the pH value of the slurried solution of gypsum to 5-3 in such a way that said slurried solution of gypsum is allowed to contain the specified organic acid component and the sulfuric acid component in the composition ratios well-balanced with the alkali component, the absorption and oxidation of the sulfur oxides in exhaust gases and the dissolution and deposition as gypsum crystals of the lime added can be readily carried out independently and side by side. Generally speaking, the process of this invention assumes the form of a reaction which smoothly occurs directly among the sulfur oxides in exhaust gases, oxygen, and lime under stable conditions. After all, the sulfur oxides in the cleaning step of exhaust gases are absorbed to be converted to gypsum as a result of the overall reactions which are represented by equations (13) and (14) in the case where the lime is lime stone or by equations (15) and (16) in the case of slaked lime. Thus, lime is added to the cleaning step of exhaust gases in an amount chemically equivalent to the sulfur oxides in said exhaust gases and an eqimolar amount of gypsum is formed.

$$2SO_2 + O_2 + 2CaCO_3 = 2CO_2\uparrow \quad (13)$$

$$SO_3 + CaCO_3 = CaSO_4\downarrow + CO_2\uparrow \quad (14)$$

$$2SO_2 + O_2 + 2Ca(OH)_2 = 2CaSO_4\downarrow + 2H_2O \quad (15)$$

$$SO_3 + Ca(OH)_2 = CaSO_4\downarrow + H_2O \quad (16)$$

As for the oxygen present in the cleaning of exhaust gases, so far as the sulfur oxides in said exhaust gases are less than 500 ppm, no more oxygen than the residual oxygen at the time of combustion of the fuel with excess oxygen will be required under certain operating conditions, but, in general, air or oxygen is to be supplied. In view of the fact that the oxygen being dissolved in the slurried solution of gypsum is directly affected by the partial pressure of oxygen, the method of supplying air or oxygen is more effective when it is introduced directly into the slurried solution, in which case the partial pressure becomes higher at least locally, than when it is added directly to the exhaust gases.

Exhaust gases differ depending on the kind and quality of the fuel as well as the method of combustion, but the gas being treated generally in the apparatus for desulfurization of exhaust gases is a nitrogen-containing gas in which sulfur dioxide is 1000-2000 ppm, $SO_3$ is 3-4% on the basis of sulfur dioxide gas, and besides, carbon dioxide is about 10%, oxygen due to excess air is 2-5%, and $NO_x$ is about 180 ppm. Further, the carbon dioxide is also formed by the reactions of equations (9) and (10) when lime stone is used as lime, but the amount of the carbon dioxide dissolved in the slurried solution of gypsum is almost negligible. This is because in the range 5-3 of the pH value of the slurried solution of gypsum that is dealt with in this invention the carbon dioxide whose first dissociation constant is on the order of $10^{-6}$ is almost in the undissociated state under the present operating conditions so that the absorption is caused only by so-called physical absorption, the amount of the carbon dioxide absorbed by chemical absorption being negligible. In addition, between the concentration of the carbon dioxide dissolved in the undissociated state and the equilibrium vapor pressure of carbon dioxide Henry's law holds true.

The gypsum formed by the sulfur oxides in exhaust gases in the cleaning step of exhaust gases is withdrawn in an amount chemically equivalent to the sulfur oxides and sent to the separating step of gypsum, in which step the gypsum is separated and taken out from the system, with the mother liquor being recycled to the cleaning step of exhaust gases for carrying out the desulfurization of exhaust gases in a continuous manner. Thus, the amount of the gypsum being withdrawn to be sent to the separating step thereof is determined according to the gypsum content in the slurried solution of gypsum.

DETAILED DESCRIPTION OF THE INVENTION AND DRAWINGS

Figure 1:
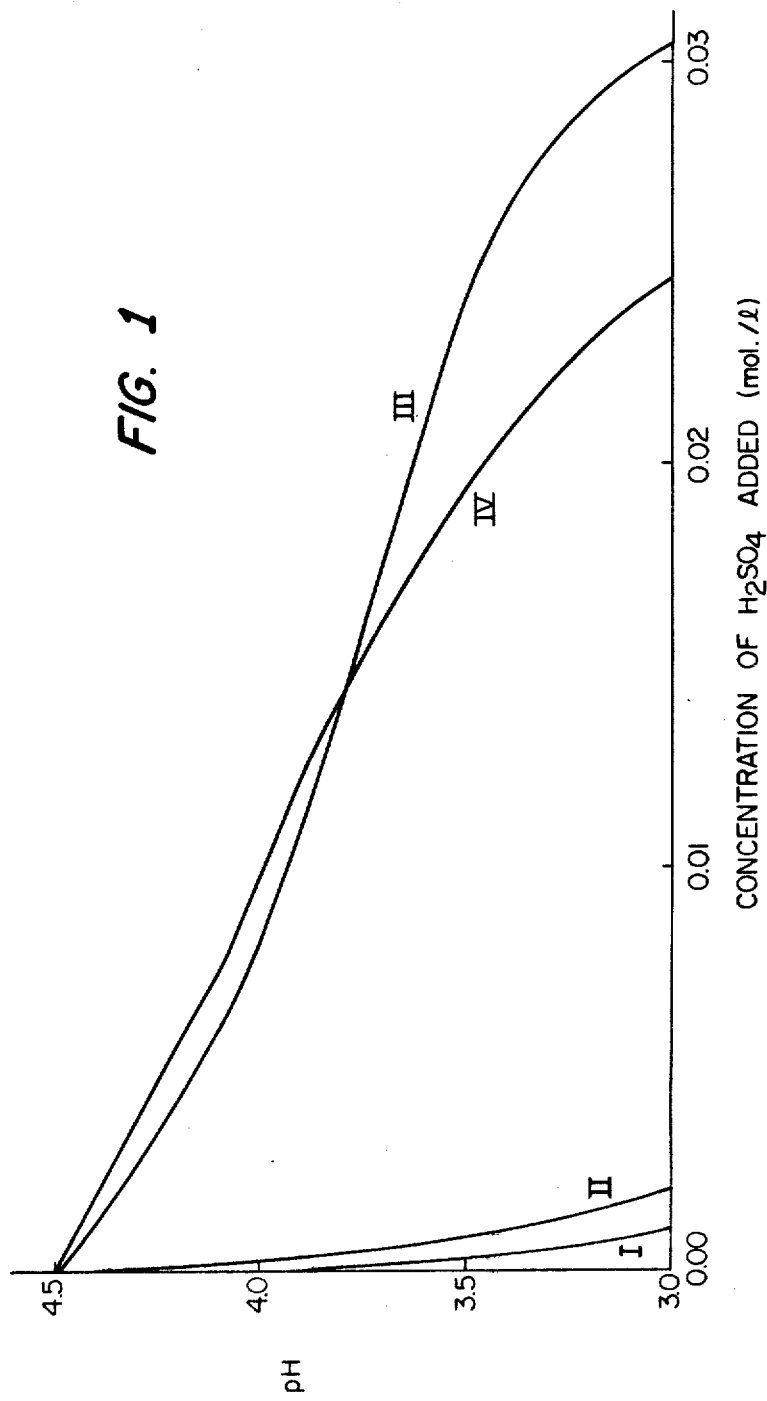

FIG. 1 indicates the buffer action for pH of the specified organic acid component added to the slurried solution of gypsum which is shown based on the experimental data obtained.

Figure 2:
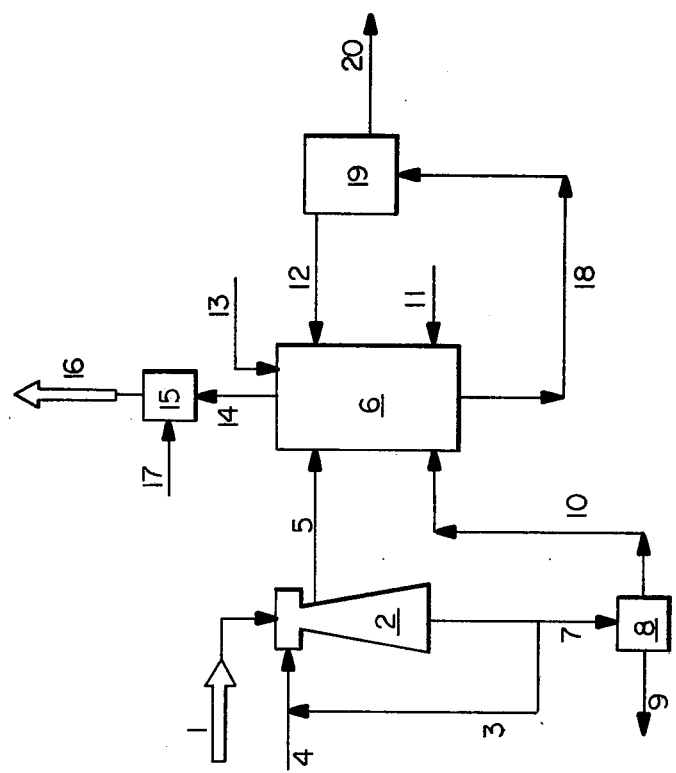

FIG. 2 indicates one embodiment of the over-all step of recovery of gypsum by the desulfurization of exhaust gases containing sulfur oxides.

FIG. 3 indicates a vertical cross-sectional view of the apparatus illustrating one embodiment of the experimental apparatus used in Examples 1 and 2 of this invention.

FIG. 1 indicates the data observed with respect to the variation in the pH value then sulfuric acid was added at 55° C. to each of 4 slurried solutions of gypsum (I) to (IV) inclusive, of which (I) was a slurried solution containing 0.3 mole of gypsum per liter of solution, (II) was a solution obtained by adding 0.05 mole of sodium sulfate to (I), (III) was a solution obtained by further adding 0.05 mole of fumaric acid and 0.0883 mole of sodium bicarbonate to (II), and (IV) was obtained by adding 0.05 mole of succinic acid and 0.0499 mole of sodium bicarbonate to (II). From the figure it is obvious that while the slurried solution of gypsum (I) and the solution (II) obtained by adding sodium sulfate to (I) are scanty in the buffer action for pH, the solutions (III) and (IV) which contained fumaric acid and succinic acid, respectively, as the typical specified organic acid component exhibit distinguished buffer action for pH.

Now, the process of this invention will be further explained as simplified steps by FIG. 2, but the process of this invention is not necessarily limited thereto. To explain with reference to FIG. 2, the exhaust gases discharged from boilers, heating furnaces, etc. are usually supplied at 130–180° C. through conduit pipe 1 to cooling dust remover 2. Through this cooling dust remover 2 there are circulated cooling water from conduit pipe 3 and a small quantity of make-up water from conduit pipe 4, so that by them the exhaust gases are cooled to 50–60° C. and at the same time freed from solid materials such as carbon dust, fly ash, etc., and then supplied through conduit pipe 5 to cleaning step 6. The greater part of the solution in cooling dust remover 2 is repeatedly used for the cooling dust removal of the exhaust gases while being circulated through conduit pipe 3 joining the make-up water. The pH value of the circulating cooling water for dust removal attains to 1.0–2.0. Portion of the solution in conduit pipe 3 is continuously sent through conduit pipe 7 to dust separator 8 in order to remove the dust such as carbon, etc. that are dispersed as insolubles therein, and then withdrawn from conduit pipe 9 after the dust has been removed. The solution freed from dust is sent through conduit pipe 10 to cleaning step of exhaust gases 6. In this cleaning step of exhaust gases a slurried solution of gypsum which contains a specified organic acid component along with sulfuric acid component and an alkali component having a pH value of 5–3 is contacted with said exhaust gases to carry out the cleaning of said exhaust gases in the presence of air or oxygen introduced through conduit pipe 11 and the excess air at the time of combustion which is contained in the exhaust gases while a predetermined amount of lime is being continuously added through conduit pipe 13. In this step, by the action of the specified organic acid component and the sulfuric acid component contained in the slurried solution of gypsum the sulfur oxides in the exhaust gases are effectively absorbed and oxidized, and the sulfuric acid component thus increasingly formed is converted to gypsum by a chemically equivalent amount of lime continuously added. The addition of the lime may be made by direct introduction, but the procedure can be carried out more smoothly when a lime slurry prepared by the use of the make-up water added for keeping the water balance in the present desulfurization is added. In addition, the lime to be added may be better used in the form grounded to less than 100 microns. The exhaust gases thus cleaned are withdrawn through conduit pipe 14, and after having been heated to 80°–150° C. by means of reheater 15 so as to enhance the ascending diffusion power they are vented through conduit pipe 16 to the atmosphere. Portion of the slurried solution of gypsum is withdrawn through conduit pipe 18 and sent to separating step of gypsum 19. The amount of the slurried solution of gypsum to be withdrawn through this conduit pipe 18 is the chemical equivalent to the gypsum formed by the sulfur oxides in the exhaust gases. In separating step of gypsum 19 the gypsum is separated and discharged through conduit pipe 20 from the system, with the mother liquor being recycled through conduit pipe 12 to cleaning step of exhaust gases 6 for carrying out the desulfurization of exhaust gases in a continuous manner. In addition, in the case where hemihydrate of alpha-type is to be recovered the gypsum which has not been washed with water and hence contains 8–10% of mother liquor is withdrawn through conduit pipe 20 and subjected to hydrothermal treatment at 95–150° C.

Further, some examples of this invention will be shown below.

EXAMPLE 1

FIG. 3 indicates the experimental apparatus used in this example. Apparatus for cleaning exhaust gases 6 is a cylindrical tank 80 mm in diameter and 230 mm high, in which the depth of the slurried solution of gypsum was taken to be 180 mm under the operating condition. The tank was provided with bladed agitator 21 in the central part of the bulk liquid and exhaust gases introducing pipe 5, 8 mm in diameter, at the position 60 mm deep from the liquid surface, said pipe having a ball filter, 20 mm in diameter at its end. The slurried solution of gypsum used was a solution having a pH value of 4.5 prepared by adding 0.05 mole of succinic acid and 0.0499 mole of sodium bicarbonate to a slurried solution containing 0.3 mole of gypsum (in dispersion without dissolving) and 0.05 mole of sodium sulfate per liter, and the treatment for the exhaust gases was carried out at 55° C. 800 Nl/hr of exhaust gases containing 1,700 ppm of sulfur dioxide, 13.5% of carbon dioxide, and 3% of oxygen on the dry basis were blown in through introducing pipe 5, and 9 Nl of oxygen-containing gas was fed with agitation through its introducing pipe 11 disposed at the position 135 mm deep from the liquid surface. Meanwhile, lime stone (6.07 g/hr) equivalent to the sulfur dioxide in the exhaust gases which entered into the cleaning step was constantly fed through pipe 13 so as to maintain the pH of the slurried solution of gypsum at a predetermined value. The exhaust gases thus desulfurized and cleaned were discharged from pipe 14. The sulfur dioxide in said desulfurized and cleaned exhaust gases was analyzed by means of an electrochemical type of sulfur dioxide analyzer to be 1–2 ppm, indicating that the rate of desulfurization was higher than 98%. In order to withdraw the gypsum in an amount as much as formed (0.0607 mole/hr) 4.94 liters of the slurried solution of gypsum was withdrawn through pipe 18. Said withdrawn slurried solution of gypsum was centrifuged for separation of gypsum, and the mother liquor was returned to apparatus for cleaning exhaust gases 6 through pipe 12. The analysis of the solids thus separated showed that they contained 99.4% or more of dihydrate gypsum but none of calcium sulfite and unreacted calcium carbonate.

EXAMPLE 2

A slurried solution of gypsum was prepared by adding 0.05 mole of fumaric acid and 0.0883 mole of sodium bicarbonate to a slurry containing 0.3 mole of gypsum and 0.05 mole of sodium sulfate, and its pH was adjusted to 4.5 at 55° C. The resulting solution was used to carry out the same procedure in the same apparatus as in Example 1, and the same result as in Example 1 was obtained.

We claim:

1. A process for desulfurization of exhaust gases and recovery of gypsum as a by-product which comprises contacting said gases with an aqueous slurry containing 0.05–1.5 mole/l of undissolved gypsum, lime that is reactive with the oxidized sulfur gases, at least 0.001 mole/l of a dicarbonyl acid component represented by the general formula: HOOCRCOOH (where R represents ethylene group, hydroxyethylene group, dihydroxyethylene group, or vinylene group), at least 0.001 mole/l of sulfuric acid, and an alkali salt from the group consisting of salts of Li, K, Na, Rb, Cs, $NH_3$ and Mg, maintaining said slurry at a pH value of 3–5, adding oxygen to oxidize the sulfur components to sulfates, continuously adding lime to said slurry in amount sufficient to react with said sulfur components, whereby the sulfur components of said gas are absorbed and oxidized and converted to gypsum, and continuously removing a portion of said slurry and separating the gypsum therefrom for recovery and recycling the mother liquor to the absorption step described above.

2. The process as described in claim 1, wheren the concentration of said organic acid component in 0.001–0.3 mole per liter of the slurried gypsum.

3. The process as described in claim 1, wherein said organic acid component is succinic acid or fumaric acid.

4. The process as described in claim 1, wherein the lime is added as limestone.

5. The process as described in claim 1, wherein the catalytic metal ions in said slurried solution of gypsum are one or more of the ions from the group consisting of $Co^{2+}$, $Ni^{2+}$, $Fe^{2+}$, $Mn^{2+}$, $Cu^{2+}$.

6. The process as described in claim 1, wherein a surface active agent is contained in said slurried solution of gypsum.

7. The process as described in claim 6, wherein said surface active agent is added in an amount of 1–50 ppm on the basis of the slurried solution of gypsum.

* * * * *

UNITED STATES PATENT AND TRADEMARK OFFICE
CERTIFICATE OF CORRECTION

PATENT NO. : 4,203,954
DATED : May 20, 1980
INVENTOR(S) : ASANAGI

It is certified that error appears in the above-identified patent and that said Letters Patent are hereby corrected as shown below:

Sheet 1 of the drawings should be deleted to appear as per attached sheet.

Signed and Sealed this

Twenty-seventh Day of January 1981

[SEAL]

Attest:

RENE D. TEGTMEYER

Attesting Officer

Acting Commissioner of Patents and Trademarks